(12) United States Patent
Baur et al.

(10) Patent No.: US 12,241,992 B2
(45) Date of Patent: Mar. 4, 2025

(54) RADAR CHIP WITH A WAVEGUIDE COUPLING

(71) Applicant: VEGA GRIESHABER KG, Wolfach (DE)

(72) Inventors: Roland Baur, Koenigsfeld (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 137 days.

(21) Appl. No.: 17/777,526

(22) PCT Filed: Nov. 4, 2020

(86) PCT No.: PCT/EP2020/080980
§ 371 (c)(1),
(2) Date: May 17, 2022

(87) PCT Pub. No.: WO2021/099122
PCT Pub. Date: May 27, 2021

(65) Prior Publication Data
US 2023/0358855 A1    Nov. 9, 2023

(30) Foreign Application Priority Data
Nov. 18, 2019    (DE) .................. 10 2019 217 736.0

(51) Int. Cl.
*G01S 7/02*    (2006.01)
*G01S 13/88*    (2006.01)
(Continued)

(52) U.S. Cl.
CPC .............. *G01S 7/027* (2021.05); *G01S 13/88* (2013.01); *H01P 5/08* (2013.01); *H01Q 1/2208* (2013.01); *H01Q 1/225* (2013.01); *H01Q 13/02* (2013.01)

(58) Field of Classification Search
CPC ....... G01S 7/027; G01S 13/88; H01Q 1/2208; H01Q 1/225; H01Q 13/02; H01P 5/08
See application file for complete search history.

(56) References Cited

U.S. PATENT DOCUMENTS

| 7,439,822 B2 | 10/2008 | Shimura et al. |
| 10,033,081 B2 | 7/2018 | Dang et al. |

(Continued)

FOREIGN PATENT DOCUMENTS

| CN | 103582070 A | 2/2014 |
| CN | 104505570 A | 4/2015 |

(Continued)

OTHER PUBLICATIONS

Combined Office Action and Search Report issued Sep. 1, 2023, in Chinese Patent Application No. 202080077491.3, with category of cited documents, 14 pages.

(Continued)

*Primary Examiner* — Vladimir Magloire
*Assistant Examiner* — Maxine McKenzie Phillips
(74) *Attorney, Agent, or Firm* — Oblon, McClelland, Maier & Neustadt, L.L.P.

(57) ABSTRACT

A radar chip including a waveguide coupling configured to couple a radar signal of the radar chip into and out of an antenna or a waveguide of a radar gauge is provided, the waveguide coupling including: a radio frequency substrate including a line, a radiating element, and a substrate-integrated waveguide disposed therebetween and connected thereto, configured to transmit the radar signal between the radar chip and the antenna or waveguide of the radar gauge and to couple the radar signal into and out of the antenna or waveguide of the radar gauge. A method of fabricating a radar chip having a waveguide coupling is also provided.

15 Claims, 3 Drawing Sheets

(51) Int. Cl.
*H01P 5/08* (2006.01)
*H01Q 1/22* (2006.01)
*H01Q 13/02* (2006.01)

(56) References Cited

U.S. PATENT DOCUMENTS

| | | | |
|---|---|---|---|
| 10,616,996 | B2 | 4/2020 | Motzer et al. |
| 10,986,547 | B2 | 4/2021 | Shen |
| 2003/0076188 | A1 | 4/2003 | Dawn et al. |
| 2006/0274992 | A1 | 12/2006 | Shimura et al. |
| 2011/0057743 | A1 | 3/2011 | Shimura et al. |
| 2011/0140801 | A1 | 6/2011 | Shimura et al. |
| 2012/0242427 | A1* | 9/2012 | Suzuki ............... H01P 5/107 333/250 |
| 2015/0048471 | A1 | 2/2015 | Hasch et al. |
| 2015/0087301 | A1 | 3/2015 | Choudhary |
| 2016/0204495 | A1 | 7/2016 | Takeda et al. |
| 2016/0301125 | A1 | 10/2016 | Kim et al. |
| 2017/0003377 | A1 | 1/2017 | Menge |
| 2017/0324135 | A1 | 11/2017 | Blech et al. |
| 2018/0226709 | A1 | 8/2018 | Maugaiahgari |
| 2019/0063983 | A1 | 2/2019 | Schultheiss et al. |
| 2019/0191545 | A1 | 6/2019 | Motzer et al. |
| 2019/0335371 | A1 | 10/2019 | Shen |
| 2020/0249067 | A1 | 8/2020 | Mayer et al. |

FOREIGN PATENT DOCUMENTS

| | | | | |
|---|---|---|---|---|
| CN | 106413041 | A | | 2/2017 |
| CN | 108141801 | A | | 6/2018 |
| CN | 108258404 | A | * | 7/2018 ............... H01P 5/08 |
| CN | 108684068 | A | | 10/2018 |
| CN | 109155899 | A | | 1/2019 |
| CN | 110061357 | A | | 7/2019 |
| CN | 110401973 | A | | 11/2019 |
| DE | 202012100664 | U1 | * | 7/2013 ............... G01V 8/14 |
| DE | 102015119690 | A1 | * | 5/2017 ........... G01F 23/284 |
| DE | 11 2016 000 846 | T5 | | 11/2017 |
| EP | 1 732 159 | A1 | | 12/2006 |
| EP | 3 492 881 | A1 | | 6/2019 |
| JP | 2015-080101 | A | | 4/2015 |
| JP | 2015-226109 | A | | 12/2015 |
| KR | 10-2015-0029735 | A | | 3/2015 |
| WO | WO 2014/126194 | A1 | | 8/2014 |
| WO | WO 2015/113566 | A1 | | 8/2015 |
| WO | WO-2015132284 | A2 | * | 9/2015 ........... G01F 23/284 |
| WO | WO 2016/092084 | A1 | | 6/2016 |
| WO | WO 2019/144297 | A1 | | 8/2019 |

OTHER PUBLICATIONS

International Search Report and Written Opinion issued Feb. 2, 2022 in PCT/EP2020/080980, 16 pages.
International Search Report and Written Opinion issued Feb. 9, 2021 in PCT/EP2020/080956, 18 pages.
International Preliminary Report on Patentability and Written Opinion issued Jun. 2, 2022 in PCT/EP2020/080980 (submitting English translation only), 10 pages.
Sun, S., et al., "A Double Waveguide Frequency Bands Waveguide-to-Microstrip Transition", Proceeding of 2014 3$^{rd}$ Asia-Pacific Conference on Antennas and Propagation, IEEE, Jul. 26, 2014, XP032710517, pp. 1172-1175.
Mozharovskiy, A., et al., "Wideband Probe-Type Waveguide-to-Microstrip Transition for 28 GHz Applications" 2018 48$^{th}$ European Microwave Conference (EUMC), European Microwave Association, Sep. 23, 2018, XP033450312, pp. 113-116.
German Office Action issued Sep. 7, 2020 in German Patent Application No. 10 2019 217 735.2, 7 pages.
German Office Action issued Sep. 7, 2020 in German Patent Application No. 10 2019 217 736.0, 8 pages.
International Search Report issued Feb. 2, 2021 in PCT/EP2020/080980 filed on Nov. 4, 2020, 3 pages.
Scheiner et al., "Microstrip-to-Waveguide Transition in Planar Form Using a Substrate Integrated Waveguide", 2018 IEEE Radio and Wireless Symposium (RWS), Jan. 15, 2018, pp. 18-20.
Search Report issued Apr. 19, 2024, in corresponding Russian Patent Application No. 2022116306/28(034336) (with English Translation of Category of Cited Documents), 4 pages.
Muhammad Imran Nawaz et al., "Substrate Integrated Waveguide (SIW) to Microstrip Transition at X-Band", Proceedings of the 2014 International Conference on Circuits, Systems and Control, Feb. 2014, pp. 61-63 and cover page.
Baolin Cao et al., "A Novel Antenna-in-Package with LTCC Technology for W-Band Application ", IEEE Antennas And Wireless Propagation Letters, vol. 13, 2014, pp. 357-360.

* cited by examiner

__(1)__

RADAR CHIP WITH A WAVEGUIDE COUPLING

REFERENCE TO RELATED APPLICATIONS

This application claims priority to German Patent Application No. 10 2019 217 736.0, filed Nov. 18, 2019, which is incorporated herein by reference in its entirety.

FIELD OF INVENTION

The invention relates to radar measurement technology. In particular, the invention relates to a radar chip with a waveguide coupling, the use of such a radar chip in a radar measurement device, and a method of manufacturing such a radar chip.

BACKGROUND

Radar gauges can be used in automation technology in the industrial environment. For example, they are designed in the form of radar level meters, which are very often equipped with horn antennas that are fed via waveguides. Especially in the frequency range between 40 and 300 GHz, the mechanical dimensions of the waveguide components are in a range that they can be well integrated in the radar unit.

The coupling of the radar signals generated by the high-frequency circuitry of the measuring device into the horn antenna can be carried out via a so-called stripline, also known as a microstrip line, which projects into a waveguide of the horn antenna.

To protect the high-frequency circuit, which can be designed as a radar chip, from mechanical stresses, it can be encapsulated in a potting compound.

SUMMARY

It is an object of the present invention to provide a radar chip with a waveguide coupling that can be protected by potting compound.

This object is solved by the features of the independent patent claims. Further embodiments of the invention result from the subclaims and the following description of embodiments.

A first aspect of the present disclosure relates to a radar chip having a waveguide coupling, arranged for coupling a radar signal of the radar chip into an antenna or waveguide of a radar measurement device and/or for coupling a radar signal out of the antenna or waveguide. This waveguide can in particular be a part of the antenna which introduces the coupled radar signal into the antenna horn.

The waveguide coupling has a high-frequency substrate, for example in the form of a printed circuit board, with a line, a radiating element and a substrate-integrated waveguide arranged therebetween and connected thereto, which is integrated into the substrate. The radiating element may be, for example, a planar excitation patch, or it may be an excitation pin or a single or double fin. This arrangement is arranged to transmit the radar signal from the radar chip to an antenna or waveguide of the radar measurement device, and to couple the radar signal into the antenna or waveguide of the radar measurement device. Likewise, the radar signals reflected from the medium to be measured can be transmitted from the antenna to the radar chip via this arrangement.

The substrate-integrated waveguide can be regarded as a filled waveguide. According to one embodiment, it has a flat top side and a flat bottom side, between which there is substrate material and which are electrically conductively connected to one another by means of vias or vias forming the "side walls" of the "waveguide".

According to one embodiment, the line, the radiating element and the top surface of the substrate-integrated waveguide arranged therebetween are arranged in the same plane of the radio frequency substrate. This plane can be an outer plane, but also a plane inside the high-frequency substrate.

According to one embodiment, the line and a top surface of the substrate-integrated waveguide are disposed in the same plane of the radio frequency substrate, with the radiating element and a bottom surface of the substrate-integrated waveguide disposed in a different plane.

According to one embodiment, the feed or line and the top of the substrate-integrated waveguide disposed therebetween are disposed on the surface of the radio frequency substrate.

According to one embodiment, the conduit is connected or attached to an initial region of the top surface of the waveguide. This initial area is, for example, the "leading edge" of the top side. Accordingly, the radiating element is connected to or attached to an end region (the trailing edge) of the top surface of the substrate-integrated waveguide.

According to a further embodiment, the substrate-integrated waveguide of the waveguide coupling has a width that is many times greater than the widths of the line and the radiating element. The width here runs parallel to the surface of the substrate and perpendicular to the propagation direction of the radar signal.

In general, it can be said that the width as shown in FIG. 1 is not necessarily the width of the conductor track. The edge and thus the width of the substrate-integrated waveguide is defined by the vias. However, the top side of the substrate-integrated waveguide can also extend over a large area and be connected to ground (circuit ground) from a "DC point of view". This in turn offers advantages with regard to Ex approval. This is because no voltage can build up on the ungrounded microstrip line that feeds the waveguide, since this is short-circuited from the DC point of view via the substrate-integrated waveguide. This in turn means that potentially flammable atmosphere cannot ignite via this line.

According to one embodiment, the width of the conduit is less than the width of the radiating element.

According to a further embodiment, the radar chip with the waveguide coupling has a potting compound in which the radar chip, the line, and a portion of the top surface of the substrate-integrated waveguide are embedded, arranged to protect the radar chip from mechanical stresses.

This potting compound can be, for example, a relatively hard potting compound, such as a two-component resin, for example GlobTop.

This potting compound also embeds the bonding wires or solder joints.

A further potting compound may also be provided, which is applied to the first potting compound after the first potting compound and completely embeds it, for example. This may be a softer potting compound, for example a gelatinous one. This is intended in particular to provide explosion protection for the entire assembly.

According to a further embodiment, the line has a first matching structure in the region of its connection to the substrate-integrated waveguide. Alternatively or additionally, the radiating element or its connecting line may have a second matching structure in the area of its connection to the substrate-integrated waveguide.

According to another embodiment, the substrate-integrated waveguide has vias from its top to its bottom.

Another aspect of the present disclosure relates to the use of a radar chip with waveguide coupling described above and below in a radar measurement device, in particular in a radar level meter. For example, the radar gauge has an antenna or waveguide that rests on top of the substrate-integrated waveguide so that a potting compound can flow into the interior of the antenna or waveguide.

Another aspect relates to a method of manufacturing a radar chip with a waveguide coupling described above and below, comprising first providing a radar chip with a waveguide coupling adapted for coupling a radar signal of the radar chip into an antenna or waveguide, followed by potting the radar chip, the waveguide, and a portion of the top surface of the substrate-integrated waveguide with a first potting compound, for protecting the radar chip from mechanical stresses.

In a possible further process step, the radar chip is encapsulated with a further potting compound which is applied to the first potting compound. The flat structure of the upper metal layer of the substrate-integrated waveguide makes it possible to realize a seal between the potting compound and the waveguide, since penetration of the second potting compound into the waveguide would result in the latter no longer fulfilling its task.

The second potting allows efficient explosion protection to be provided in addition to mechanical protection.

In the following, embodiments are described with reference to the figures. If the same reference numerals are used in the following description of figures, these designate the same or similar elements. The illustrations in the figures are schematic and not to scale.

DETAILED DESCRIPTION OF EMBODIMENTS

Radar level gauges are very often equipped with horn antennas fed via waveguides. Especially in the frequency range between 40 and 300 GHz, the mechanical dimensions of the waveguide components are in a range that they can be well integrated in the radar unit.

Figure 3:
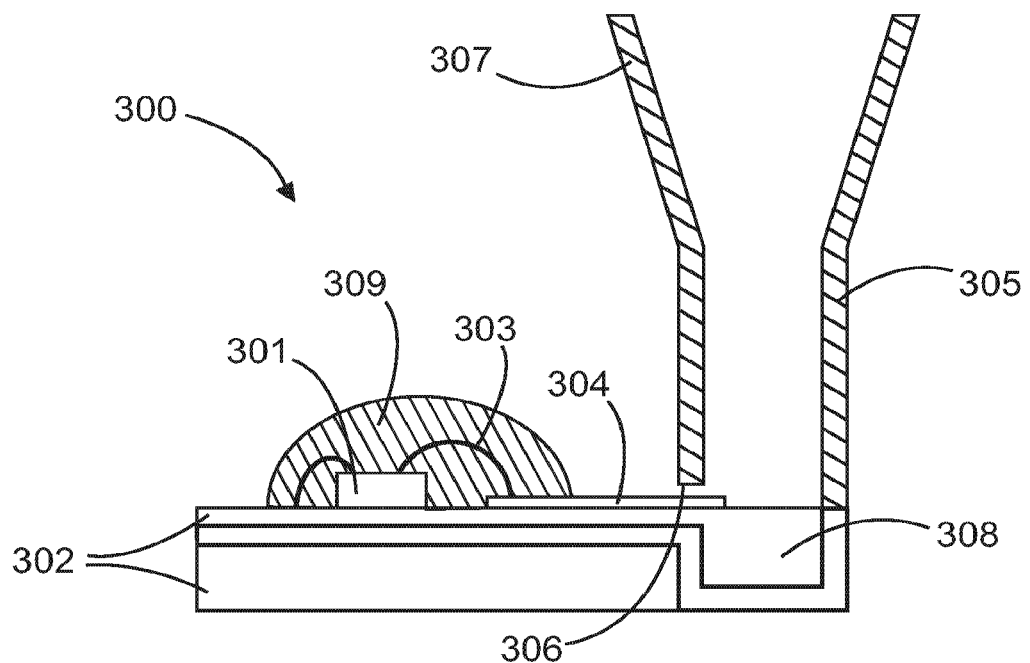
FIG. 3 shows a side view of a radar gauge with a waveguide coupling.

FIG. 3 shows a side view of a radar measuring device with a waveguide coupling. For radar-based level measurement, a high-frequency measurement signal is generated in the electronics unit of a radar module 300 on a radar chip 301. The unhoused radar chip sits on a special printed circuit substrate 302 that has good high-frequency characteristics, such as low signal attenuation. It is bonded there, for example, and is contacted with bond connections 303. The high-frequency radar signal is then fed to a stripline 304 (microstrip line) via the bond connection 303. Alternatively, the chip may be soldered to the substrate. The radar signal is then fed to a stripline 304 (microstrip line) via a solder connection. The microstrip line in turn leads directly into a waveguide 305, which is perpendicular to the radio frequency substrate. The waveguide has a small gate 306 through which the microstrip line passes.

The waveguide is connected to the antenna 307. The radar signal can be transmitted and received via this arrangement. To increase the bandwidth of the transition between the microstrip line and the waveguide, a resonator 308 integrated in the substrate can be used. To protect the radar chip from mechanical stress, dust or other contaminants, it is potted under an epoxy resin 309 (GlobTop) together with the bond joints or solder joints. The resin is applied in liquid form to the chip and the substrate. The resin flows over the microstrip line up to an undefined point.

However, this arrangement has some disadvantages, which are eliminated by the arrangement described below.

A disadvantage is that the GlobTop 309 covers the microstrip line only up to an undefined range. Since the GlobTop 309 differs in dielectric properties from air, the microstrip line has a different impedance in the area where it is covered by the GlobTop material than in the area where the line is surrounded by air.

Furthermore, radar units can be approved for use in potentially explosive atmospheres under certain conditions. A prerequisite for this can be that the entire electronics unit is encapsulated under a potting compound 401 so that no ignitable mixture can accumulate in the electronics. In order to be able to potting such an electronics unit, it must be sealed to the outside. However, this can pose a problem in connection with the high-frequency signal. The waveguide should not be filled with potting compound, otherwise its high-frequency properties may be degraded. However, since the microstrip line enters the waveguide through a gate, this would inevitably happen with the setup described above.

Figure 1:
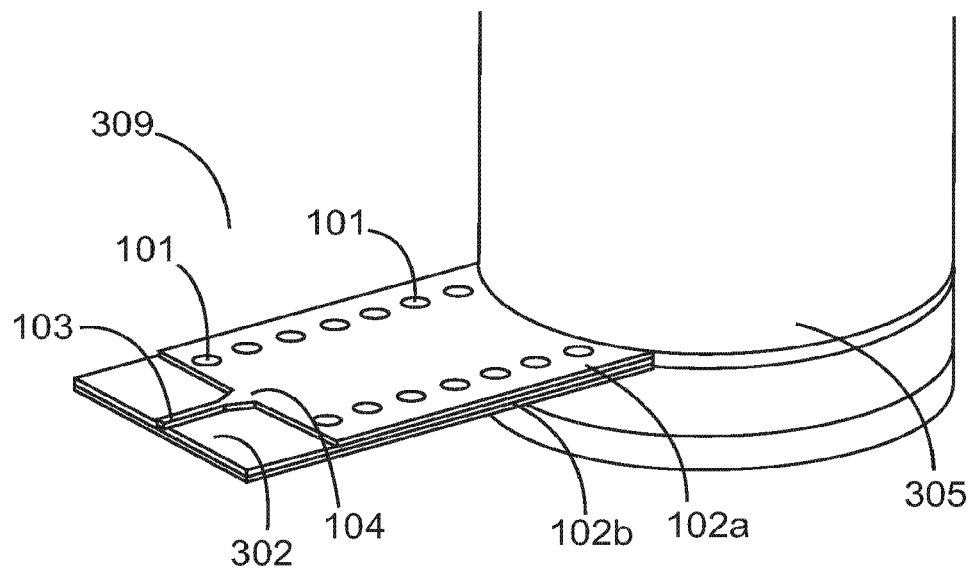
FIG. 1 shows a waveguide coupling according to one embodiment.

A solution to this problem is illustrated in FIG. 1. The electromagnetic wave propagates at a stripline 103, also referred to as a "line" in the context of the present disclosure, between the overlying conductive path and the ground layer in the dielectric of the PCB. This wave is transferred into a filled waveguide consisting of the PCB material 302, the two copper layers 102a 102b and vias 101, also referred to as a substrate integrated waveguide in the context of the present description. The term copper layer is to be interpreted broadly.

The substrate-integrated waveguide 102a, 102b, 101 leads directly into the waveguide 305 of the antenna and the high-frequency signal is coupled there. Matching structures in the form of tapers 104, which create a transition between the respective waveguide structures with less attenuation and reflection from a high-frequency point of view, prove to be advantageous. Inside the waveguide 305, the electromagnetic wave is fed into the waveguide of the antenna via an appropriately matched excitation patch 201, which lies on the same plane as the upper metal layer of the substrate-integrated waveguide and, like this surface, is also at ground potential, or another type of radiating element.

The resonator pot (resonator element) 308 represents a way of transferring (coupling) the high-frequency signal, which is carried on a printed circuit board, into the waveguide in a broadband manner and vice versa. Without the resonator element, the signal could only be transmitted in a narrow band. The resonant element creates an additional resonance in the transmission behavior of the line type on the printed circuit board and the waveguide. The first resonance (at resonance points the energy is transferred very well into the waveguide) is formed by the radiating element. Its geometric dimensions are tuned to produce (exactly) one resonance in the desired frequency range.

The second resonance (that of the resonator pot) can be significantly influenced by the pot depth. The depth is in the range of a quarter wavelength in the substrate.

The wave, which moves on the conductor of the printed circuit board into the waveguide, detaches from the radiating element. One part of the wave runs in the direction of the waveguide opening, the other part runs in the direction of the resonator pot. At the bottom of the resonator pot, the wave is reflected and now also runs in the direction of the waveguide opening. This reflected wave is now constructively superimposed on the wave that is already running in the direction of the waveguide opening, which has a very positive effect on the transmission behavior.

As an alternative to a resonator pot, a double fin can be provided as a radiating element.

The GlobTop material 309 can now be extended out to the smooth surface 102a of the substrate integrated waveguide 102a, 102b, 101, 302. The substrate-integrated waveguide, by its nature, is completely independent of anything on its top and bottom surfaces, including the GlobTop material. Therefore, the extent to which the GlobTop in its liquid form flows onto the substrate-integrated waveguide is of little relevance at this point.

Since the entire microstrip line can now be cast under GlobTop material on the side facing the radar chip, the impedance of the line can be tuned to a defined impedance of 50 ohms, for example. The taper 104 is matched to the GlobTop material.

Figure 4:
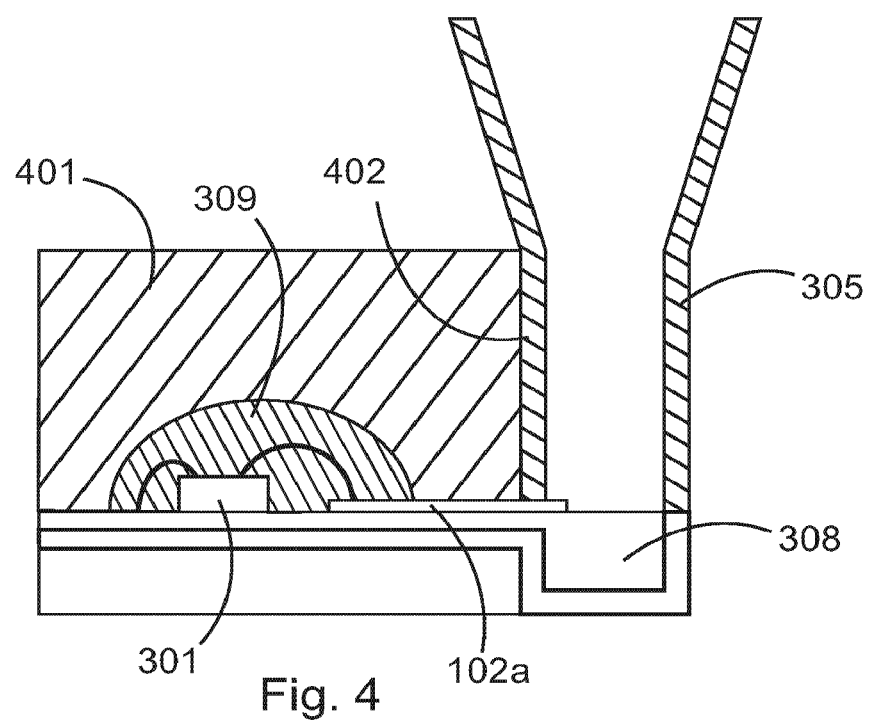
FIG. 4 shows a side section view of a radar gauge with a waveguide coupling according to an embodiment.

Furthermore, the metallic waveguide can now be designed in such a way that its outer wall 402 rests directly on the surface of the waveguide integrated in the substrate, see FIG. 4.

A sealing surface is no longer necessary in this case, since there is no longer an opening in the waveguide of the antenna and thus the potting compound described above cannot flow into the waveguide, but at the same time the high-frequency signal can be coupled into the waveguide.

Figure 2:
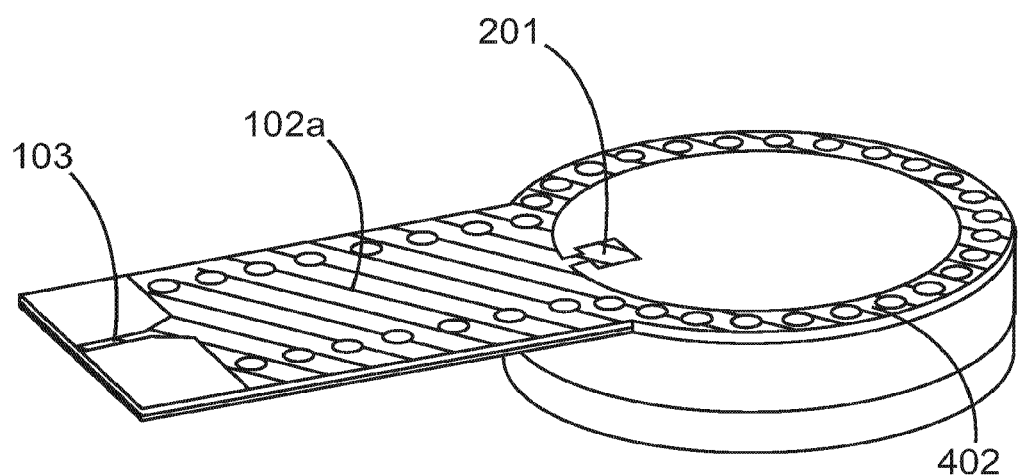
FIG. 2 shows the waveguide coupling of FIG. 1 without round waveguide.

FIG. 2 shows the waveguide coupling of FIG. 1 without a circular waveguide. The metallic upper surface 102a of the substrate-integrated waveguide terminates in an annular structure, which is also connected to the lower copper layer 102b by means of vias. The two layers 102a, 102b need not have annular end regions. However, it is advantageous if they have at least a circular inner contour so that the radiating element 201 has sufficient space. It is convenient to adapt the inner contour of the two layer end regions to the inner contour of the waveguide 402 resting thereon, as shown in the figures (here, the waveguide 402 is a circular waveguide). However, the inner contours can also be oval or rectangular. In the latter case, one speaks of a rectangular waveguide.

Figure 5:
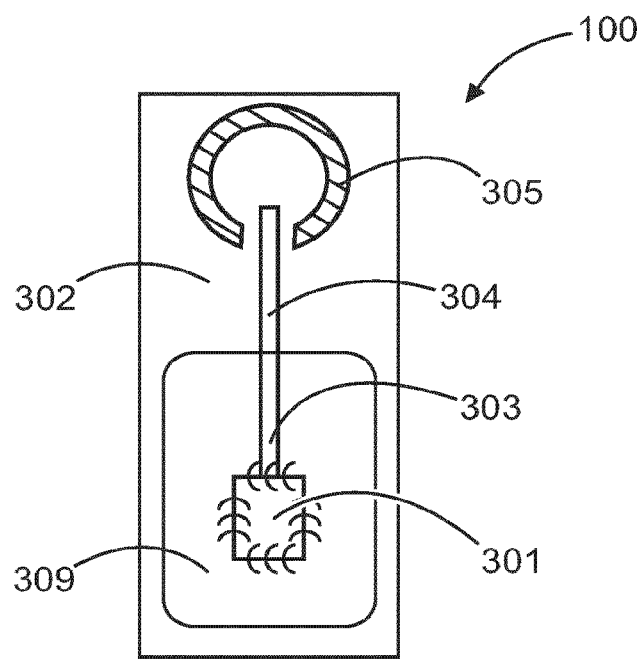
FIG. 5 shows a top view of the waveguide coupling shown in FIG. 3.
Figure 6:
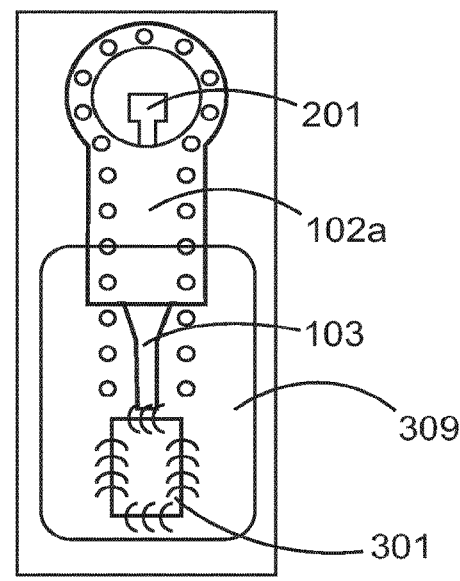
FIG. 6 shows a top view of the waveguide coupling shown in FIG. 4.

FIGS. 5 and 6 each show a top view of corresponding radar modules. FIG. 5 shows the embodiment of FIG. 3. FIG. 6 shows the case where the GlobTop material 309 finds a defined termination on the microstrip line through the substrate-integrated waveguide.

An important aspect is that the sealing between the potted electronics and the air-filled waveguide is eliminated, due to the direct connection of the substrate-integrated waveguide to the waveguide. The electromagnetic energy is thereby transported in the dielectric of the board with an uninterrupted ground plane throughout. This eliminates the need for a microstrip line, which in turn is advantageous in terms of transmission behavior.

Another aspect relates to avoiding undefined locations of the impedance jump between GlobTop-surrounded microstrip line and air-surrounded microstrip line.

A "gate" to the waveguide that is subject to tolerances can be eliminated, resulting in less scatter in performance during manufacturing.

Also, the distance between the radar chip and the waveguide can be reduced, allowing for a more compact design.

The top copper layer, shown in FIG. 1, shows the stripline 103 on the left, onto which the radar chip 301 feeds. In the center is the area with the substrate-integrated waveguide and the smooth copper surface. The transparent contour 309 (cf. FIG. 6), which lies above the stripline for signal feed and half above the filled substrate-integrated waveguide, represents the GlobTop material. On the right side, one can see the substrate-integrated waveguide that feeds the signal into the antenna.

The bevels 104 at the junction of the stripline 103 and the ground plane 102a of the waveguide serve to improve the transition between the stripline and the waveguide and improve matching, thereby reducing reflections. The vias 101 form the two walls of the filled waveguide and connect the copper surfaces 102a and 102b.

The electromagnetic wave is excited in the waveguide via a patch 201 connected to the upper copper layer 102a at the end of the substrate integrated waveguide. The two copper patches 102a and 102b can be connected to the ground potential (earth) in this process.

Alternatively, provision may be made to locate the connection of the exciter patch at the lower ground layer 102b.

Figure 7:
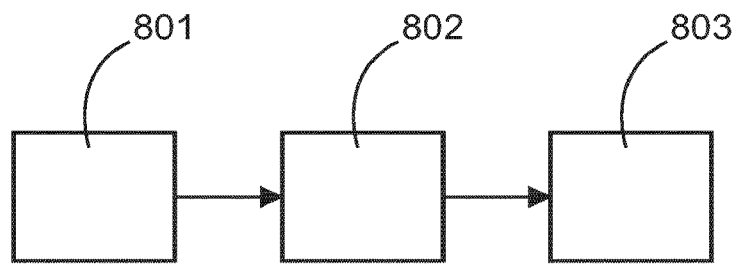
FIG. 7 shows a flow diagram of a process according to an embodiment.

FIG. 7 shows a flow diagram of a method according to one embodiment. In step 701, a radar chip described above is provided with a waveguide coupling. In step 702, the radar chip, its line and a portion of the top surface of the substrate-integrated waveguide are potted with a first potting compound to protect the radar chip from mechanical stress. In step 703, the radar chip is potted with a further potting compound, which is applied to the first potting compound, for explosion protection.

During this process, it is not necessary to ensure that no potting compound enters the waveguide or antenna because the interior of the antenna or waveguide is sealed where the radio frequency signal enters the waveguide or antenna.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A radar chip comprising a waveguide coupling configured to couple a radar signal of the radar chip into and out of an antenna or a waveguide of a radar gauge, the waveguide coupling comprising:

a radio frequency substrate comprising a line, a radiating element, and a substrate-integrated waveguide disposed therebetween and connected thereto, configured to transmit the radar signal between the radar chip and the antenna or waveguide of the radar gauge and to couple the radar signal into and out of the antenna or waveguide of the radar gauge; and a resonator element integrated in the radio frequency substrate at an end thereof at which end the radio frequency substrate is connected to the antenna or the waveguide, wherein a wave, which moves on the line into the substrate-integrated waveguide, detaches from the radiating element, in which one part of the wave propagates towards an opening of the waveguide, and the other part of the wave propagates towards the resonator element, the other part of the wave that propagates to the resonator element is reflected at the resonator element so as to also propagate towards the waveguide opening, thereby coupling the radar signal into the antenna or into the waveguide.

2. The radar chip according to claim 1, wherein the line, the radiating element, and a top surface of the substrate-integrated waveguide disposed therebetween are arranged in a same plane of the radio frequency substrate.

3. The radar chip according to claim 1,
wherein the line and a top surface of the substrate-integrated waveguide are arranged in a same plane of the radio frequency substrate, and
wherein the radiating element and a bottom surface of the substrate-integrated waveguide are arranged in a different plane.

4. The radar chip according to claim 1, wherein the line and a top surface of the substrate-integrated waveguide disposed therebetween are arranged on a surface of the radio frequency substrate.

5. The radar chip according to claim 1,
wherein the line is connected to an initial portion of a top surface of the substrate-integrated waveguide, and
wherein the radiating element is connected to an end portion of the top surface of the substrate-integrated waveguide.

6. The radar chip according to claim 1, wherein the substrate-integrated waveguide of the waveguide coupling has a width that is at least two times greater than widths of the line and the radiating element.

7. The radar chip according to claim 1, wherein a width of the line is less than a width of the radiating element.

8. The radar chip according to claim 1, further comprising:
a first potting compound, in which the radar chip, the line, and a portion of a top surface of the substrate-integrated waveguide are embedded, configured to protect the radar chip from mechanical stresses.

9. The radar chip according to claim 8, further comprising:
a further potting compound, which is applied to the first potting compound after the first potting compound.

10. The radar chip according to claim 1,
wherein the line comprises a first matching structure in a region of a connection of the line to the substrate-integrated waveguide, or
wherein the radiating element or a feed line of the radiating element comprises a second matching structure in a region of a connection of the feed line to the substrate-integrated waveguide.

11. The radar chip according to claim 1, wherein the substrate-integrated waveguide comprises vias from a top thereof to a bottom thereof.

12. The radar chip according to claim 1, wherein the radar chip is configured for level measurement in a radar level meter.

13. The radar chip according to claim 12, wherein the radar gauge comprises an antenna or a waveguide that rests on a top surface of the waveguide.

14. A method of fabricating a radar chip having a waveguide coupling according to claim 1, the method comprising steps of:
providing a radar chip having a waveguide coupling configured to transmit a radar signal between the radar chip and an antenna or a waveguide of a radar gauge (300), the waveguide coupling comprising:
a radio frequency substrate comprising a line, a radiating element, and a substrate-integrated waveguide disposed therebetween and connected thereto, configured to transmit the radar signal between the radar chip and the antenna or the waveguide of the radar gauge and to couple the radar signal into and out of the antenna or the waveguide of the radar gauge; and
potting the radar chip, the line, and a portion of a top surface of the substrate-integrated waveguide with a first potting compound to protect the radar chip from mechanical stresses.

15. The method according to claim 14, further comprising the step of:
potting the radar chip with a further potting compound, which is applied to the first potting compound.

* * * * *